April 21, 1931.  F. B. LLEWELLYN  1,802,118
MODULATOR AND SYSTEM OF MODULATION
Filed Nov. 26, 1927
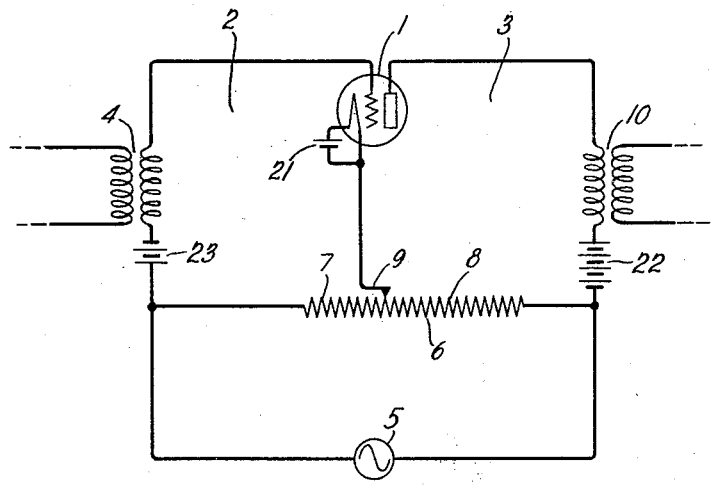
INVENTOR
FREDERICK B. LLEWELLYN
BY *J. P. Neville*
ATTORNEY Patented Apr. 21, 1931

1,802,118

UNITED STATES PATENT OFFICE

FREDERICK B. LLEWELLYN, OF MONTCLAIR, NEW JERSEY, ASSIGNOR TO BELL TELEPHONE LABORATORIES, INCORPORATED, OF NEW YORK, N. Y., A CORPORATION OF NEW YORK

MODULATOR AND SYSTEM OF MODULATION

Application filed November 26, 1927. Serial No. 235,827.

The invention relates to a method of and means for effecting modulation.

Heretofore it has been proposed to effect modulation by controlling the amplifying power of a space discharge tube in accordance with a signaling wave.

It is well known that the amplifying power of a space discharge tube is directly proportional to the amplification factor $\mu$, and inversely proportional to $R_o + Z$, i. e., to the total impedance in the output circuit comprising the sum of the internal resistance $R_o$ of the tube and the external impedance Z. Obviously the amplifying power may be controlled either through the amplification factor or the internal resistance.

In a system described in Patent No. 1,350,752, August 24, 1920, to Van der Bijl, the amplifying power of a space discharge tube is controlled by variation of the internal resistance to effect modulation.

In accordance with the present invention a space discharge device is adjusted so as to have its amplification factor controlled in accordance with variations in the modulating wave while the internal resistance is or may be kept substantially constant. Modulation is thus effected by variation of the amplification factor instead of by variation of the internal resistance. Modulation which might be caused by any variation of the internal resistance is prevented by suppressing the carrier current in the variable resistance or plate filament path so that the carrier current is unaffected by the variable internal resistance and is not modulated thereby.

An object of the invention is to vary the amplification factor of a space discharge tube in accordance with signals to effect modulation of a carrier wave.

Another object is to effect carrier suppression by applying a carrier wave through a resistance having adjustable portions in the input and output circuits of a space discharge modulator, whereby the ratio of the carrier applied to the respective circuits may be controlled.

The invention is explained in connection with the accompanying drawing, which represents one embodiment.

The scope of the invention is not restricted, however, to the system shown, but is limited only by the appended claims.

The drawing shows a space discharge tube 1 having an input circuit 2 and an output circuit 3. Filament heating, space current, and grid biasing potential are furnished to the tube by sources or batteries 21, 22 and 23, respectively.

A modulating wave is applied to the input circuit through a transformer 4. A carrier wave is generated by a source 5 and applied to a resistance 6 having adjustable portions 7 and 8 included in the input and output circuits, respectively.

The negative terminal of the filament of the space discharge tube is connected to a sliding contact 9, whereby the ratio of portions 7 and 8 of resistance 6 may be adjusted. By the interaction of the carrier wave and the modulating wave in the tube a modulated wave is produced in the output circuit 3 and may be led off through transformer 10 to a load of any sort, for example, a line or transmission system.

Early measurements of space discharge tubes led to the belief that the amplification factor was a constant of the tube. Later, it was discovered that in most tubes the value of this factor is dependent on the grid-filament and plate-filament potentials. This dependence affords a means utilized in this invention for controlling the plate current to effect modulation.

Space discharge tube 1 is preferably one which shows a proportionately large variation of amplification factor with grid and plate potentials and, in addition, shows a relatively small or negligible variation of internal resistance. If a number of tubes are available the best tube for the purpose may be selected either from measurements of the amplification factor and internal resistance as a function of the inter-electrode potentials or by comparative operating tests in the circuit of the present invention.

A suitable method of measuring the amplification factor and internal resistance of a space discharge tube is described by J. M. Miller in Proceedings of the Institute of Radio Engineers, vol. 6, No. 3, pages 141–148, June, 1918. If greater accuracy is desired, a refinement of Miller's method may be used such as is found in an article by E. Peterson and H. P. Evans entitled "Modulation in vacuum tubes used as amplifiers", published in the Bell System Technical Journal, vol. 6, No. 3, pages 442–460, July, 1927.

Adjustment of the circuit for the suppression of the carrier wave in the output to prevent modulation due to variation in the internal resistance may best be carried out in the absence of an input from transformer 4. With source 5 supplying a carrier wave the sliding contact 9 may be adjusted to a position which gives a minimum of carrier current in the secondary of transformer 10. Due to the series arrangement of circuit 3, this procedure is equivalent to an adjustment for a minimum of carrier current in the plate filament path or variable internal resistance of tube 1.

A thermocouple and ammeter (not shown) may be used in a well-known manner to measure the carrier current and aid in finding the condition of most complete suppression.

It will be found that the optimum position of sliding contact 9 will be such as to make resistances 7 and 8 stand approximately in the ratio of $1:\mu$.

To minimize energy losses in resistance 6 its value should be made small in comparison with the total impedance in circuit 3.

When the circuit is used as a modulator the wave applied to transformer 4 is generally known as the modulating wave. The circuit may also be used as a demodulator or detector, in which case the applied wave is a modulated wave. In either case the carrier component in the output may be suppressed in the manner described.

The operation of the invention may be more clearly understood by reference to the following considerations.

It may first be supposed that a space discharge tube is available having an amplification factor substantially independent of variations in grid and plate potentials over a considerable range. Such a tube conforms with the earlier view which regarded the amplification factor as a constant. If the tube be employed in the circuit illustrated in the drawing and if contact 9 be adjusted in accordance with the procedure given above for suppressing the carrier wave, then a balanced condition is established in output circuit 3. Under this condition the carrier voltage impressed in the circuit by the potential drop in resistance 8 is substantially offset by the carrier voltage produced in circuit 3 by amplification of the potential drop in resistance 7 of circuit 2, whereby the potential is multiplied by the amplification factor.

If current variations are set up in transformer 4, the carrier balance of circuit 3 will remain undisturbed as long as the current variations do not cause the grid or plate potentials to depart from the range of values within which the accompanying amplification factor is substantially constant. In other words, the applied current variations are inoperative to produce a carrier current in the output circuit, either modulated or unmodulated, the manner of application of the carrier wave being such as to produce a balanced condition which precludes plate current modulation in a tube having a substantially constant amplification factor, $\mu$.

Again it may be supposed that a tube has been selected in accordance with this specification and has been found to exhibit a proportionately large variation of its amplification factor when its grid and plate potentials are varied over an extended range of values. If the circuit be adjusted for carrier suppression as specified above, a balanced condition is established for a particular pair of grid and plate potentials only. The balance may readily be disturbed by varying the grid and plate potentials, as, for example, by setting up current variations in transformer 4. When the carrier balance is thus destroyed, a modulated current from the carrier source 5 is caused to flow in output circuit 3, wherein it is effective in producing a secondary current in transformer 10. Modulation of the carrier wave is thereby effected while the unmodulated carrier component is suppressed.

What is claimed is:

1. The method of modulation employing a modulator having a variable amplification factor and a variable internal resistance which comprises applying a carrier wave to the modulator, controlling the amplification factor in accordance with signals to effect modulation of the carrier wave, and preventing further modulation due to the variable internal resistance.

2. A method of modulation employing a modulator having a variable amplification factor, a variable internal resistance and input and output circuits which comprises varying the amplification factor to modulate the carrier wave in accordance with signals and preventing modulation due to variation of the internal resistance by applying the carrier wave to the input and output circuits in such ratio that carrier suppression is effected in said variable internal resistance.

3. A modulator comprising a device having a variable amplification factor and a variable internal resistance, means for applying a carrier wave to said device, means for controlling said amplification factor in accordance with signals and means for neutralizing the effect of said variable internal resistance upon the carrier wave.

4. A system of modulation comprising a modulator, input and output circuits therefor, means for controlling the amplification factor of said modulator, a carrier source, and means for applying the carrier wave to said input and output circuits in such ratio as to effect carrier suppression in the variable internal resistance of said modulator, whereby the effect of said variable resistance is substantially neutralized.

5. A method of modulation employing a distorting device having a variable amplification factor, a variable internal resistance and input and output circuits, and an impedance having adjustable portions in said input and output circuits, which comprises varying the amplification factor in accordance with a modulating wave, applying a carrier wave to the distorting device through said impedance, and adjusting said portions of impedance to neutralize the effect of said variable internal resistance upon the carrier wave.

6. A modulating system comprising a distorting device, input and output circuits therefor, a resistance common to said input and output circuits, a carrier source, means for applying the carrier to said resistance, and adjustable means associated with said resistance for controlling the ratio of carrier supplied to said input and output circuits.

7. A modulating system comprising a space discharge tube having an amplification factor and an internal resistance, a plurality of wave sources, means actuated by waves from said sources to vary the amplification factor, and means for preventing at least one of said waves from producing current in said internal resistance, whereby said wave is prevented from varying the internal resistance.

8. A modulating system comprising a space discharge tube having an amplification factor and an internal resistance, a plurality of wave sources, means actuated by waves from said sources to vary the amplification factor, and means for suppressing at least one of said waves in said internal resistance, whereby the tendency of variation of said internal resistance to modulate said wave is neutralized.

9. Means for supplying waves to the input circuit of a modulator while suppressing said waves in the output circuit of the same, said means comprising a resistance having adjustable portions in each of said circuits, and a wave source connected to said resistance.

10. Means for supplying a carrier wave to a modulating system, said means comprising resistances in different parts of said system, at least one of said resistances being adjustable, and a carrier source connected to said resistances.

In witness whereof, I hereunto subscribe my name this 22 day of November, A. D. 1927.

FREDERICK B. LLEWELLYN.